United States Patent [19]

Catala et al.

[11] Patent Number: 4,703,427

[45] Date of Patent: Oct. 27, 1987

[54] METHOD FOR EVALUATING THE QUALITY OF CEMENT SURROUNDING THE CASING OF A BOREHOLE

[75] Inventors: Gerard Catala, Meudon; Ian Stowe, Montrouge; Daniel Henry, Gyf-sur-Yvette, all of France

[73] Assignee: Schlumberger Technology Corporation, New York, N.Y.

[21] Appl. No.: 767,933

[22] Filed: Aug. 21, 1985

[30] Foreign Application Priority Data

Aug. 24, 1984 [FR] France ............................... 84 13220

[51] Int. Cl.$^4$ ......................... G01N 29/04; C01V 1/40
[52] U.S. Cl. ................... 364/422; 324/368; 367/31; 367/34; 367/35; 181/105
[58] Field of Search .................. 364/422; 324/368; 367/35, 31, 34, 47, 41; 181/105; 33/302

[56] References Cited

U.S. PATENT DOCUMENTS

| | | | |
|---|---|---|---|
| 3,265,151 | 8/1966 | Anderson | 181/0.5 |
| 3,291,247 | 12/1966 | Majani et al. | 181/0.5 |
| 3,291,248 | 12/1966 | Majani | 367/35 |
| 3,292,146 | 12/1966 | Dewan | 367/35 |
| 3,401,773 | 9/1968 | Synnott | 181/0.5 |
| 4,217,659 | 8/1980 | Glenn | 367/32 |
| 4,255,798 | 3/1981 | Havira | 367/35 |
| 4,382,290 | 5/1983 | Havira | 367/35 |
| 4,551,823 | 11/1985 | Carmichael | 367/35 |
| 4,596,143 | 6/1986 | Norel | 367/27 |

FOREIGN PATENT DOCUMENTS 1316116 12/1962 France .
8307831 5/1983 France .
2491123 2/1984 France .
2034888 6/1980 United Kingdom .

Primary Examiner—Jerry Smith
Assistant Examiner—Gail Hayes
Attorney, Agent, or Firm—David P. Gordon; David G. Coker

[57] ABSTRACT

A method for evaluating the quality of the cement surrounding a borehole casing is provided. The method generally comprises obtaining signals which were recorded by a CET tool known in the art, and processing the signals by: dividing each signal into particularly defined time windows; determining absolute magnitudes for each signal which are functions of the energy of the signal in the respective windows; determining normalized magnitudes for each signal from the absolute magnitudes and normalization parameters; and evaluating the quality of cementation as a function of the fact that the normalized magnitudes for each signal obey a predetermined law, and as a function of the relationship between each normalized magnitude and a pair of threshold values respectively associated therewith.

According to another aspect of the invention, information obtained from a CBL tool known in the art is compared to the information gained from the CET tool. If the curves output by the respective tools diverge, the presence of gassy cement is determined. If, after correcting for gassy cement the curves diverge, additional information as to the environment beyond the casing may be obtained.

32 Claims, 12 Drawing Figures

WINDOWS W1 W3 W2

FREE CASING (NOT SURROUNDED BY SOLID)
W2 HIGH    W3 HIGH

PROPERLY SUPPORTED CASING
W2 LOW    W3 LOW

REFLECTIONS DUE TO UNDERGROUND FORMATIONS
W2 HIGH    W3 LOW

X1 ←|→ X10
VERTICAL SCALE

WINDOWS W1 W3 W2

FIG. 3A.

FREE CASING (NOT SURROUNDED BY SOLID)
W2 HIGH   W3 HIGH

FIG. 3B.

PROPERLY SUPPORTED CASING
W2 LOW   W3 LOW

FIG. 3C.

REFLECTIONS DUE TO UNDERGROUND FORMATIONS
W2 HIGH   W3 LOW

X1 ← | → X10
VERTICAL SCALE

METHOD FOR EVALUATING THE QUALITY OF CEMENT SURROUNDING THE CASING OF A BOREHOLE

BACKGROUND

The present invention relates to boreholes which are drilled for exploration or for exploiting underground wealth. The invention more particularly relates to evaluating with ultrasonic tools the quality of the cement which surrounds a casing in a borehole, the cement being inserted in the borehole to hold the casing and to perform the function of hydraulic sealing.

Ultrasonic tools for investigating the environment surrounding the casing are known in the art. For example, the CBL tool (Cement Bond Log), uses an ultrasonic emitter and an ultrasonic receiver which are spaced apart along the casing. The CBL tool operates according to the general principle that if the receiver rapidly receives a strong echo, then the casing is vibrating and is not being supported by cement. On the other hand, if the strong echoes arrive late at the receiver, or if no strong echoes arrive at all, it may be supposed that the casing is properly held by the cement which surrounds it. Each measurement performed by the CBL tool is applicable to a length of casing substantially equal to the distance between the tool's ultrasonic emitter and receiver.

Another tool which has recently appeared for testing the environment surrounding a casing is known as a CET (a trademark of Schlumberger) tool (Cement Evaluation Tool). In contrast to the CBL tool, the CET tests the casing in radial sectors. To accomplish the same, the CET tool generally comprises eight ultrasonic emitter/receiver transducers which are spaced both angularly and axially (e.g. along a helix) relative to the casing. The CET preferably additionally comprises a reference transducer together with a reflector which is located at a fixed distance relative thereto. The reference transducer is arranged to provide the in situ speed of ultrasound inside the casing.

With the CET tool arranged as described, it is thus possible to perform eight acoustic diameter measurements and to subsequently determine the degree of any ovalization of the casing as well as any off-centering of the sonde carrying the tool relative to the casing axis. Moreover and more importantly, the CET tool makes it possible to evaluate the quality of the cement to some degree in several angular directions in each cross section of the casing. Thus, the CET tool is good at determining over the various angular directions scanned by the transducers whether the casing is free to vibrate in a thickness resonance mode, i.e. the casing is surrounded by gas, or whether it is well held by the cement. In contrast, situations intermediate to the casing being well held ("cement domain") and the casing being free to vibrate ("gas domain") are more difficult to analyze.

Presently, it is the practice in such intermediate situations (the "intermediate domain") to deduce measurements of the cement's Resistance to compression in each angular direction scanned by the transducers and to characterize the cement therefrom in terms of its mechanical strength. However, the inventors have observed that the compression resistance is an imperfect representation of the quality of the hydraulic seal which is sought around the casing between the various underground layers through which the borehole passes. In particular, it can happen that cement whose compression resistance appears to be satisfactory is in fact permeable to gas, in particular via communicating pores.

SUMMARY OF THE INVENTION

It is therefore an object of the present invention to obtain signals resulting from the ultrasonic testing of a casing and to process such signals so as to produce an accurate interpretation concerning the quality of the cement surrounding the casing.

A further object of the invention is to make it possible to distinguish whether, in each angular sector that is scanned by a CET tool, the material situated immediately outside the casing is solid or liquid or whether it contains gas.

Another object of the invention is to determine whether or not the material surrounding the casing, if solid, contains communicating pores.

Yet another object of the invention is to synergistically exploit the combination of information supplied by a CBL tool and a CET tool.

In accordance with the objects of the invention a method for evaluating the quality of the cement surrounding borehole casing is provided. The method generally comprises:

(a) obtaining signals which are a function of the axial and angular position of a sonde relative to a casing and which are received in response to pulses, suitable for inducing thickness resonance in a casing, emitted by a plurality of ultrasonic emitter/receiver transducers aimed at zones in different angular directions;

(b) defining three time windows for each obtained signal, a first time window (W1) defined by a first echo corresponding to the reflection of ultrasonic waves off the inside wall of the casing, a second time window (W2) corresponding to the decreasing intermediate portion of the following echoes resulting from the environment outside the casing, and a third time window (W3) corresponding to the initial portion of said following echoes;

(c) determining two absolute magnitudes (AW2i, AW3i) for each obtained signal, in which a first magnitude (AW2) represents the ratio between the signal energies received in the second and the first time windows, and the other magnitude (AW3i) represents the ratio between the signal energies received during the third and the first time windows;

(d) determining two normalized magnitude (W2Ni, W3Ni) for each obtained signal from at least said absolute magnitudes (AW2i, AW3i); and (e) deciding on the quality of the cement surrounding the casing as a function of the fact that the normalized magnitudes (W2Ni, W3Ni) for each obtained signal obey a predetermined law, and as a function of the relationship between each normalized magnitude (W2Ni, W3Ni) and a pair of threshold values respectively associated therewith (W2NC, W3NC; W2NC, W3NG).

The signals obtained by the invention may be obtained from a computer, a tape, a disk, etc. Alternatively, a sonde suitable for inducing thickness resonance in the casing may be placed in a known manner in a casing, the anode carrying a tool provided with ultrasonic emitter/receiver transducers aiming at zones in different angular directions. The transducers on the tool should then be selectively excited, and recording should be selectively made of the signals received from each transducer in response to its emission pulse, said signals containing data on the material situated outside the casing in the zone scanned by the transducer, taking account of the axial and anugular position of the sonde in the casing.

According to the invention, the normalized magnitudes preferably are derived from the absolute magnitudes according to linear combinations of the form:

W2Ni = a (AW2i − b)

W3Ni = a' (AW3i − b')

where a, a', b and b' are coefficients chosen to take account of the absolute response of free casing in the presence of a predetermined environment, such as water outside the casing and mud inside the casing.

Also, according to the preferred embodiment of the invention, the cement surrounding the casing is evaluated on the basis of the second normalized magnitude (W3Ni) of a particular signal if the value of the first normalized magnitude (W2Ni) is greater than given by the said predetermined law. The evaluation of the cement is performed preferably as follows. First, thresholds (W2NC, W3NC; W2NG, W3NG) for the normalized magnitudes are determined from a threshold impedance characteristic of cement or of gas and from the diameter/thickness characteristics of the casing.

Having determined the applicable thresholds, the quality of the cementing is preliminary evaluated as follows. If at least one of tthe corresponding normalized magnitudes (W2Ni, W3Ni) is less than the lower threshold which is appropriate thereto (W2NC, W3NC), it is decided that the casing is surrounded by a solid and is correctly cemented in the zone scanned by the particular transducer. On the other hand, if the two corresponding normalized magnitudes (W2Ni, W3Ni) exceed their respective upper thresholds (W2NG, W3NG), it is decided that the casing is surrounded by gas in the zone scanned by the particular transducer. Finally, where the two normalized magnitudes (W2Ni, W3Ni) exceed thir respective lower thresholds (W2NC, W3NC), but at least one of the normalized magnitudes is less than its upper threshold (W2NG, W3NG), gassy cement, or incorrect cementing or the presence of a liuid (the intermediate domain) are recognized in the zone scanned by the particular transducer.

To distinguish between gassy cement and the presence of liquid or poor (e.g. contaminant) cement which is also called "incorrect cementation", the invention provides for a statistical analysis on the results obtained for the scanned zones at different angular directions and on a determined length of the casing. The analysis determined whether or not gas is present on tthe basis of the number of zones clearly situated in a gaseous domain. If it appears that the environment is gas, the results relating to the zones which are presumed to contain liquid or poor cement are modified to consider them as constituting porous cement housing gas.

According to another aspect of the invention, a CBL type tool having an axially spaced ultrasound emitter and receiver is also lowered in the casing. The information gained from the CBL tool is then compared to the information gained from the CET tool, and if the CBL tool reveals a supported tube while the CET tool gives results in the "intermediate domain", the sonde is determined to be in the presence of gassy cement. If, one the other hand, but tools give concordant results, the sonde is considered to be in the presence of liquid or poor cement. With such information, it is then possible to analyze the angular results of the CET tool in order to determine whether or not the cement pores are in communication with one another.

In practice, the method invention is advantageously completed by illustrating in a diagram from, and at different angular spacings where appropriate, the presence of proper cement, gassy cement, liquid or poor cement, and gas along the casing.

A better understanding of the invention, and additional advantages and objects of the invention will become apparent to those skilled in the art upon reference to the detailed description and the accompanying drawings.

DETAILED DESCRIPTION OF THE PREFERRED EMBODIMENTS

Figures 1, 7:
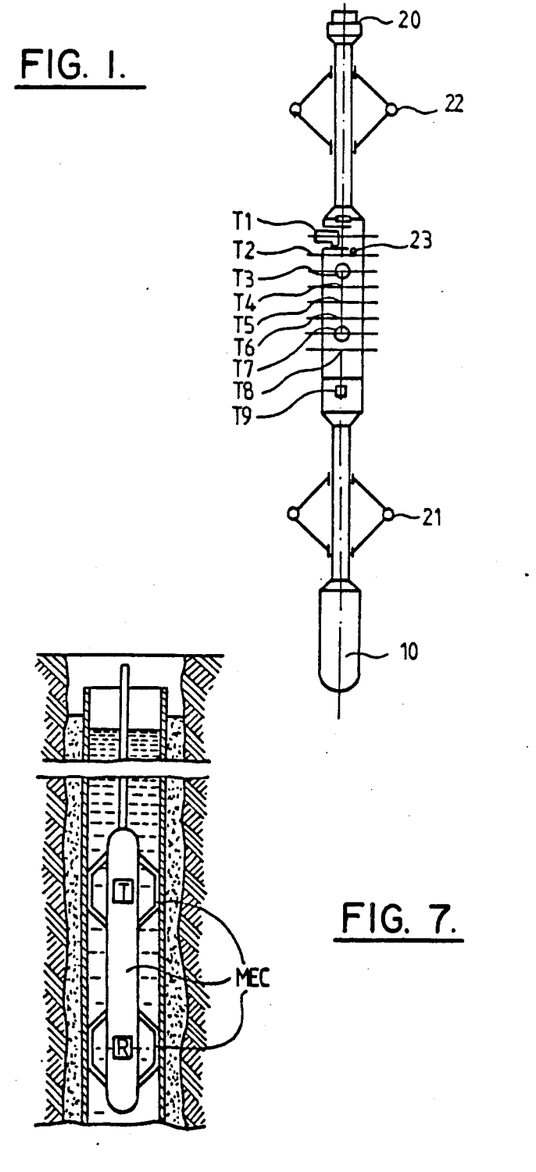
FIG. 1 is a diagram of a CET tool.
FIG. 7 is an diagram of a CBL tool.

FIG. 1 shows a sonde equipped with a CET tool. The sonde includes a bottom nose 10, a connection means 20, and two centering devices 21 and 22 such as are described in U.S. Ser. No. 608,057 which is assigned to the assignee herein. The centering devices 21 and 22 are located on opposite ends of the CET tool, thus bracketing the tool.

As indicated by FIG. 1, the CET tool comprises a series of eight transducers T1 to T8, some of which are represented diagrammatically, and a ninth reference transducer T9 which is equipped with a metal reflector at a known fixed distance (not shown). The transducers T1 to T8 are typically about 2.5 cm in diameter. They are preferably distributed helically at a 45 degree spacing from one another, and may be more particularly located by means of an adjusting screw 23. Each of the transducers is used for sending ultrasonic pulses toward the casing and for receiving resulting signals. However, the reference transducer and metal reflector which are oriented axially are particularly used to enable an in situ measurement of the speed of propagation of sound in the fluid in the casing.

Transducers T1 to T8 are distributed helically so that a significant portion of the circumference of the borehole casing may be investigated. The area of the casing investigated by each of the transducers T1 to T8 is substantially equal to the area of the front face of the transducer since dispersion is low in the frequency band utilized (typically longitudinal waves in the range 300 to 600 kHz).

As is known in the art, ultrasonic pulses are sequentially triggered in the various transducers. The corresponding received signals from each transducer are analyzed in the same sequential manner via an electronic cartridge (not shown) mounted upstream from the connection 20 of the sonde. This electronic cartridge amplifies the received signals before transmitting them to the surface. Because the depth position of the sonde in the borehole is monitored, the signals received at the surface are depth related. In addition, the radial direction associated with each received signal is defined as a function of the transducer concerned and of the angular position of the sonde in the casing, the manner of detection of which is known.

Further explanations on the operation of a CET tool may be found in a commercial brochure by Schlumberger dated June 1983, and entitled "Cement Evaluation Tool" and in U.S. Pat. No. 4,255,798 to M. Havira (which is hereby incorporated by reference herein) and French Pat. No. 2,491,123 to B. Seeman which are both assigned to the assignee herein. These documents are particularly useful for, among other things, showing diagrams which are used in the art to display the results of CET tool processed information.

As has already been indicated, the CET tool has served in the art to determine whether a casing is properly held by continuous solid cement of very good quality or whether the casing is free, i.e. surrounded by a liquid such as water, muds or a gas, and thus not cemented at all. Because the cementing of casing is a complex technique which makes use of numerous parameters, many factors may lead to the cementing being imperfect. Thus, in between the situations of continuous solid cement of very good quality and a free casing surrounded by gas there remains an "intermediate domain" in which analysis is more difficult. Indeed, the techniques known up to the present have considerable difficulty even in defining the limits of this intermediate domain. Presently, any results given by a CET tool in the intermediate domain have been interpreted in terms of the strength of materials. Thus, the CET tool measurements for each depth and for each angular direction being scanned have been translated into values corresponding to the compression resistance of the cement. The present invention, however, provides a different approach than that of the prior art.

Figure 2:
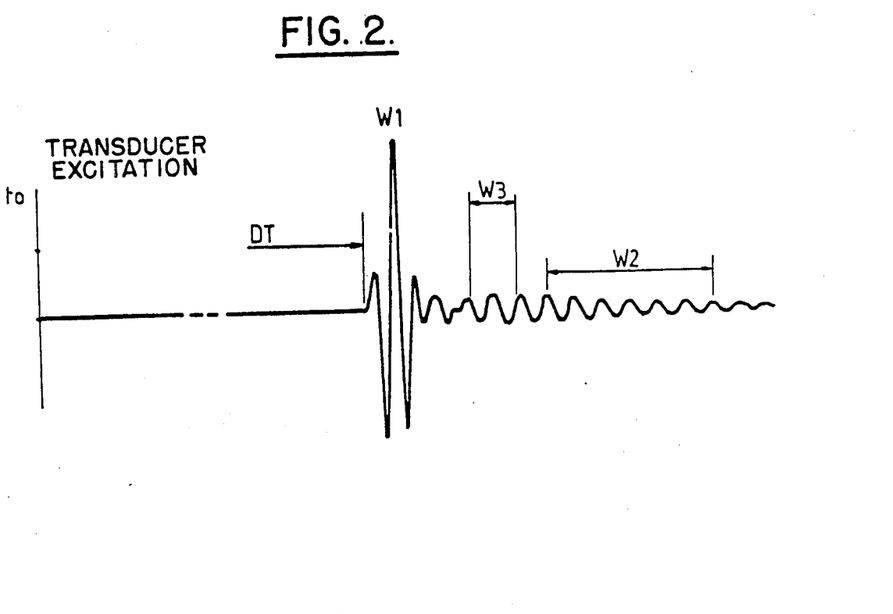
FIG. 2 shows a sample of the wave picked up by one of the transducers of a CET tool.

FIG. 2 shows the appearance of the signal received by a transducer starting from the instant of the excitation of the transducer up until the received signal is hardly detectable. The first detectable signal which begins at DT is in essence an echo of the longitudinal ultrasonic waves which are propagating in the fluid inside the casing off the inside wall of the casing, i.e. the interface between the fluid inside the casing and the casing. A first time window W1 is defined by the invention as including this first detectable signal. Because only the maximum or peak amplitude is utilized by the invention, W1 can be chosen to correspond to the exact peak time.

The remainder of the signal detected by the transducer are echoes due to material situated outside the casing, i.e. the casing interface with cement or liquid, and the liquid or cement interface with liquid, cement, or the formation. As seen in FIG. 2, the additional echoes fall off in amplitude. A second time window W2 is defined by the invention to be in the intermediate portion of the additional echoes, and is typically about 20 microseconds long. The starting point of the second time window is chosen to be far enough away from W1 so as to avoid reflecting the wave energy of the first echo, but early enough so that enough signal of measurable value may be detected. Finally, a third, shorter time window W3 (typically about 5 microseconds long) is defined by the invention to be before the second time window W2 but after time window W1. The end of the third time window is chosen so that there is no influence on the third time window from the reflection of the third interface, i.e. the casing or liquid interface with the formation.

Figure 3A:
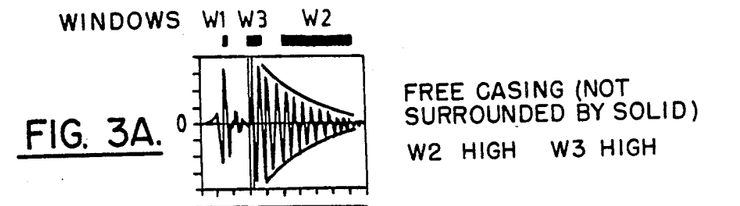
FIGS. 3A through 3C show three typical waveforms corresponding to three specific cementation situations.
Figure 3B:
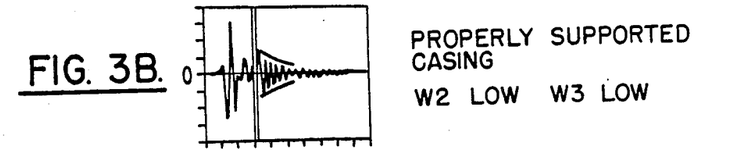
Figure 3C:
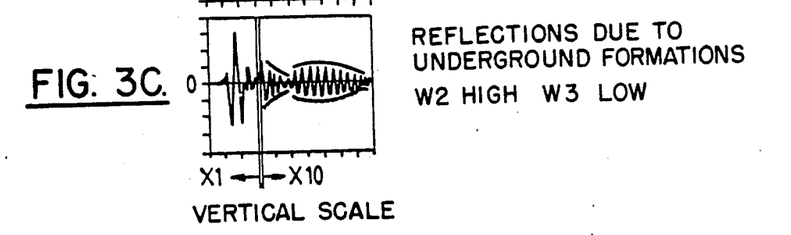

Turning to FIGS. 3A to 3C, the received signals in three different situations are shown, with the vertical scale being magnified by a factor of ten after the first echo. As shown by FIG. 3A, where a free casing unsupported by a solid is found, high values in W2 and W3 result. In contrast, as seen in FIG. 3B, where tubing is well supported by its cement low values in W2 and W3 are obtained. In the situation of FIG. 3C where the undergound formations situated a little further away from the casing produce echoes (third interface), a higher level is obtained in W2 while a relatively low level is obtained in W3.

According to the invention, signals received in response to pulses emitted by a plurality of ultrasonic emitter/receiver transducers which were aimed at zones in different angular direction and which are suitable for inducing thickness resonance in a casing are obtained. The invention is intended to encompass both the situation where a tape, disk, or other hardware suitable for storing information is obtained, and where the signals are obtained by actually placing a sonde having a CET tool downhole and exciting the transducers and recording the results. Regardless, the obtained signals are processed as follows. First, the three windows W1, W2 and W3 are chosen and defined as set out above. Then, for each obtained signal, two absolute magnitudes $AW2i$, $AW3i$ are determined on the basis of the energy situated in the three windows, the index i being used to associate each signal with a particular transducer and with a given sonde position (i.e. with a given depth and a given angular direction in the casing). The absolute magnitudes are determined as follows:

$$AW2i = \frac{\text{energy contained in } W2i}{\text{energy contained in } W1i} = \frac{W2Ti}{W1Ti} \quad (1a)$$

$$AW3i = \frac{\text{energy contained in } W3i}{\text{energy contained in } W1i} = \frac{W3Ti}{W1Ti} \quad (1b)$$

As indicated above, since the window W1 is very narrow, it is possible to take the instantaneous value For W1i without integrating. Moreover, the peak measurement W1 is advantageously used to eliminate the effects of transducer sensitivity by dividing it into the resonance measurements W2 and W3. After the absolute magnitudes are determined for each obtained signal, normalized magnitudes $W2Ni$ and $W3Nj$ are determined for each signal. While normalizations techniques have already been proposed for CET touls which take into account the individual response of each transducer together with other parameters, the present invention preferably uses normalization of the following form:

$$W2Ni = a\,(AW2i - b) \quad (2a)$$

$$W3Ni = a'\,(AW3i - b') \quad (2b)$$

where a, a', b and b' are coefficients which, generally speaking, may be determined in a manner which is described in more detail below with reference to an example. In determining the normalization coefficients, one of the conditions to be satisfied is that for a reference medium which is generally water, the normalization should give W2Ni=W3Ni. Simplified normalization which is often adequate would consist in setting the coefficients b and b' to zero. Where b and b' are zero, the coefficients a and a' may be determined in the laboratory as described below.

For the size and weight of the casing under consideration, a calibration value W2Ci may be obtained in the laboratory for each of the transducers Ti of the tool being used. The calibration value is representative of the response of each of the transducers Ti in the presence of the particular casing, with water around the outside, and either water or mud on the inside of the casing. In the calibration procedure, the transducer Ti is placed in a position similar to that which it will occupy in a borehole. A calibration or normalization constant W2Ci is then determined for each transducer (i=1 to 8) according to the following relationship (for the mud/casing/water interfaces):

$$W2Ci = \frac{W2Ti}{W1Ti} \quad (3)$$

in practice, a set of values W2Ci are determined for an entire range of media which the tool may encounter inside the casing an that a proper calibration value may be used according to the particular circumstances.

Having determined the calibration constants, the normalization of the first absolute magnitude (AW2i) may then be written:

$$W2Ni = \frac{W2Ti}{W1Ti} \cdot \frac{1}{W2Ci} \text{ with } a = \frac{1}{W2Ci} \quad (4)$$

As will be readily appreciated, the same analysis may be performed for the signals W3. Thus, $$W3Ci = \frac{W3Ti}{W1Ti} \quad (5)$$

for the mud/casing/water interfaces, from which can be written:

$$W3Ni = \frac{W3Ti}{W1Ti} \cdot \frac{1}{W3Ci} \text{ with } a' = \frac{1}{W3Ci} \quad (6)$$

The measurements W2Ni and W3Ni obtained in the manner described above are extremely accurate and reliable. As a result, they can be related in a reliable manner to the nature of the material situated outside the casing in the zone being scanned by the transducer in question.

Figure 5:
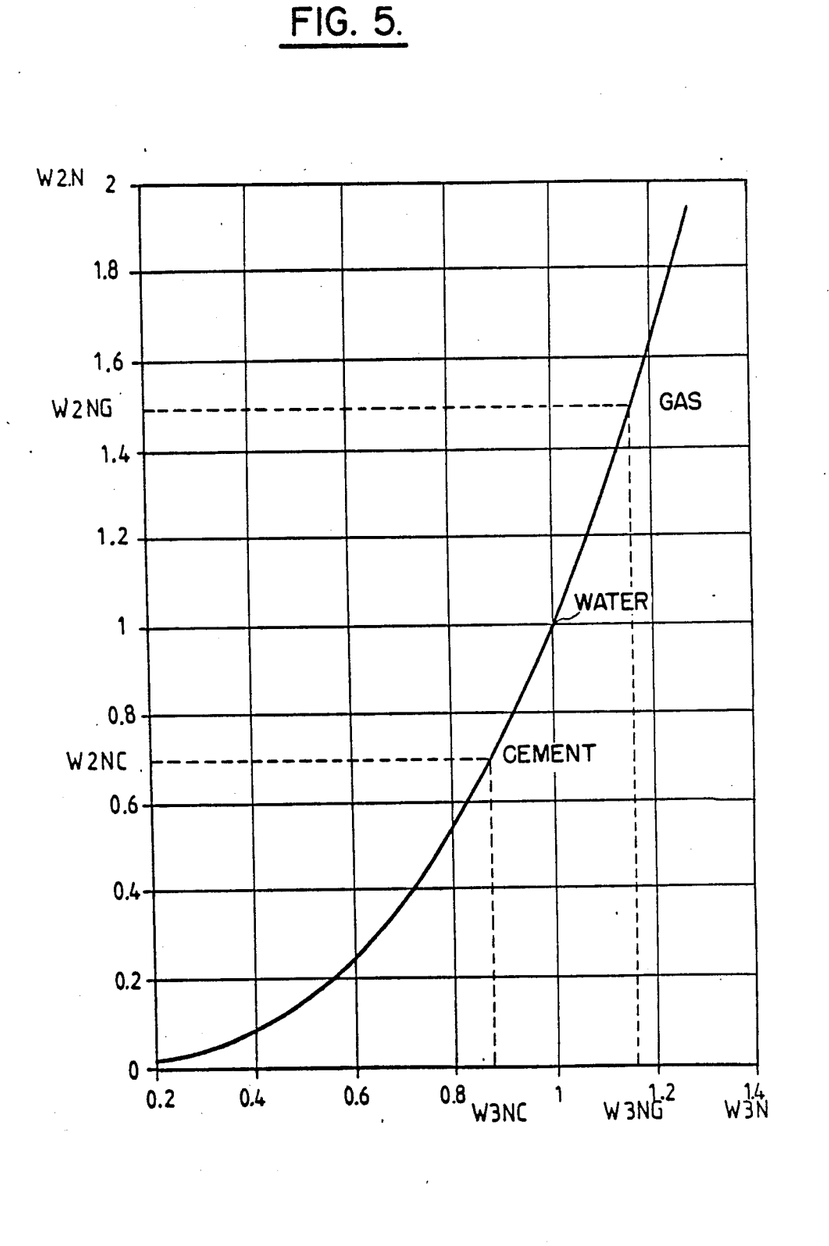
FIG. 5 is a graph showing a predetermined law relating two corresponding normalized CET measurements.

More generally, the applicant has observed that the normalization described above may be performed so that the magnitudes W2Ni and W3Ni determined thereby obey a predetermined law $$W2Ni = f(W3Ni) \quad (7a)$$

where no reflections from the underground formations which would define a third interface are found. Preferably, the following simple law is used:

$$W2Ni = (W3Ni)^p \quad (7b)$$

where p is a number close to 2.15 (to within +0.005 according to current investigations), and a representation of the law is seen in FIG. 5.

Figure 4:
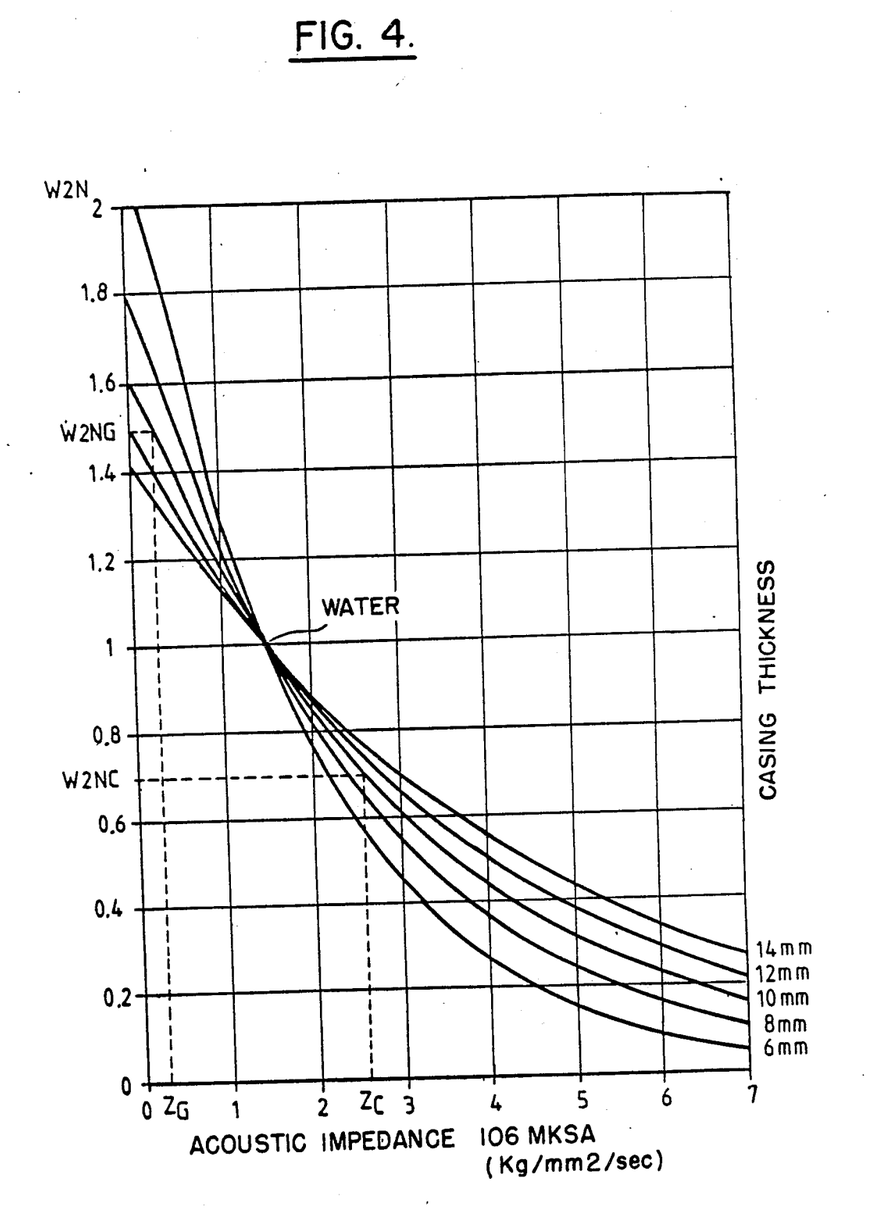
FIG. 4 is a graph showing the varistion of a normalized measurement from a CET tool as a function of the various parameters.

Further studies performed by the applicant have shown that the absolute response of a medium outside a casing may be determined relative to the response of water, the thickness of the casing, and the acoustic impedance of the medium according to the following approximation:

$$\frac{W2(Zx)}{W2(Zw)} = \exp\frac{Zw - Zx}{A \times TH + B} \quad (8)$$

where A is about 0.30 kg/mm$^3$/second and B is about 0.20 kg/mm$^2$/second, where TH is the thickness of the casing in millimeters, where WZ(Zx) designates the absolute response (absolute magnitude) for a medium to be determined outside the casing, with the acoustic impedance of the medium denoted Zx, and where WZ(Zw) is the absolute response of water outside the casing having an acoustic impedance Zw, the acoustic impedances expressed in kg/mm$^2$/s. Relationship (8) is graphically shown in FIG. 4. Those skilled in the art will appreciate that WZ(Zw) is in fact exactly W2Ti for the mud/casing/water interface as measured in the laboratory.

Having provided a method for the accurate normalization of the obtained signal measurements, a relationship (7b) between determined normalized magnitudes, and a relationship (8) between absolute magnitudes of media and the impedences of those media, the invention provides for the use of a CE1 tool to obtain information which is very accurate concerning the nature of the material surrounding the casing. According to the invention, the quality of the cementing surrounding the casing is determined as a function of the fact that the pairs of normalized magnitudes (W2Ni, W3Ni) obey a predetermined law, and as a function of the relationship between each normalized magnitude (W2Ni, W3Ni) and a pair of threshold values respectively associated therewith (W2NC, W3NC ; W2NG, W3NG).

More particularly, an initial verification is made that each pair of magnitudes W2Ni and W3Ni obey the predetermined law (7b). If this is the case, thease magnitudes are compared with the above-mentioned thresholds for each transducer. The thresholds are chosen and defined as follows. W2NC and W3NC are defined as the lower thresholds for normalized magnitudes W2Ni and W3Ni respectively, and both characterized a selected acoustic threshold impedance ZC which is preferably set to 2.6 kg/mm$^2$/sec. The selected threshold impedance ZC is chosen to distinguish a minimum acceptable cement of impedance 2.8 from a heavy mud of density 1.6 g/cm3 whose acoustic impedance is 2.4. Those skilled in the art will recognize, however, that the particular threshold impedance ZC (which defines the lower thresholds W2NC and W3NC on the basis of relationship 7b and 8 above) may be adjusted as a function of the nature of the cement being used and the muds expected to be encountered. In particular, some cements have acoustic impedances which may lead to the threshold impedance being lowered to 2.0 these types of cements are not used in the presence of heavy muds.

W2NG and W3NG are defined as the upper thresholds for the normalized magnitudes and are fixed on the basis of identifying the presence of gas outside the casing. Because the maximum acoustic impedance of gas under pressure as encountered in a borehole is about 0.1 kg/mm$^2$/sec, the impedance threshold ZG is fixed at several tenths, typically 0.2 (as seen in FIG. 4). W2NG and W3NG may be deduced from the impedance threshold according to relationships 7b and 8 given above, or from FIGS. 4 and 5.

Having determined the applicable thresholds, the quality of the cementing is preliminarily evaluated as follows. If at least one of the corresponding normalized magnitudes (W2Ni, W3Ni) is less than the lower threshold which is appropriate thereto (W2NC, W3NC), it is decided that the casing is surrounded by a solid and is correctly cemented in the zone scanned by the particular transducer. On the other hand, if the two corresponding normalized magnitudes (W2Ni, W3Ni) exceed their respective upper thresholds (W2NG, W3NG), it is decided that the casing is surrounded by gas in the zone scanned by the particular transducer. Finally, where the two normalized magnitudes (W2Ni, W3Ni) exceed their respective lower threshholds (W2NC, W3NC), but at least one of the normalized magnitudes is less than its upper threshold (W2NG, W3NG), gassy cement, or incorrect cementing or the presence of a liquid (the intermediate domain) are recognized in the zone scanned by the particular transducer.

With the ability to reliably distinguish a solid environment surrounding the casing from a gaseous environment surrounding the casing according to values obtained and thresholds provided, the frontiers of the intermediate domain become clearly defined numerically. In actuality, the intermediate domain indicates that the environment surrounding the casing may be constituted either by gassy cement or else by a liquid or poor cement. The former situation would cause W2Ni and W3Ni to be above their respective thresholds due to the effect of the gas in the cement on the average acoustic impedance determined. The presence of a liquid such as water also would naturally cause the acoustic impedance, and thus the normalized magnitudes, I to fall in between the cement and gas thresholds.

If it is determined that the environment surrounding the casing is an intermediate domain environment, the invention provides two methods of determining whether the environment is a gassy cement or a liquid or a poor cement. The first method for distinguishing between the two uses the measurements from the CET tool only and has been named "gas logic", while the second method, which will be described in detail below, uses a comparison of the results of the CET tool with the COL tool. In "gas logic", the normal or default mode is to consider all intermediate domain indications as relating to the presence of a liquid or poor cement. However, if a statistical analysis of the results shows that it is manifestly clear that there is a gas in contact with the casing in various points of the zone under examination, the "gas logic" changes mode. In the second mode (or "gas mode") of the "gas logic" operation, the measurements of the intermediate domain are considered as relating to porous cement with the pores of the cement being filled with gas. It is of note that studies and observations performed by the inventors have shown that such porous cements are frequently present.

As above-mentioned, to determine which mode of gas logic should be used, a statistical analysis is performed on the domain indications which were derived from a processing of the signals received by the transducers. The statistical analysis is preferably performed as follows. The measurements over about one meter of casing are examined to determine the proportion of the transducers which find gas, i.e. a value of W2Ni greater than 1+DW, (where DW is a parameter taking account of the uncertainty of the measurements) relative to those for which the measurement is in the intermediate domain. If this ratio exceeds a threshold RG, which is adjustable and preferably about 30%, the gas mode of the logic is implemented. Of course, the parameters DW and RG may be adjusted, if necessary on site, so as to take account of the context which may lead to the gas mode of the gas logic being switched off (e.g. it is known in advance that no gas is present). With the results obtainable from the invention, it is possible to make a diagram of the results in a more accurate manner than accomplishable by the prior art. In particular, it is possible to illustrate at once; the circumferential (around the casing) distribution of points with acceptable cementing which correspond to transducers which have a response greater than the threshold impedance ZC; the circumferential distribution of free gas at the casing/outside. interface by the points which correspond to transducers which have a response lower than the threshold impedance ZG; and the circumferential distribution of points corresponding either to unacceptable cemont or to liquid, and points corresponding to cement having gaas-filled pores (where gas logic is used). Conventional shading (as described, for example, in French Pat. No. 2,491,123 to R. Seeman) is naturally used to facilitate reading the results, and may also be used to indicate whether the gas logic has been applied or not.

The method according to the invention is now described in more detail with the help of examples. To begin with, FIG. 4 illustrates the relationship between the normalized magnitude W2N and the accoustic impedance of the medium outside the casing for various thickness of casing. The inventors have observed that normalizing relative to water (W2N=1, impedance of 1.5 kg/mm$^2$/sec) is satisfactory for all thickness of casing. The same is naturally true for the normalized magnitude W3N. Thus, when the thickness of the casing is known, e.g. 10 mm, and when suitable threshold impedance Zc and Zg, e.g. 2.6 and 0.2 respectively, are chosen, W2NC and W2NG may be deduced from the 10 mm curve in FIG. 4 giving W2NC=0.7, and W2NG=1.5.

In determining W3NC and W3NG, it is helpful to use FIG. 5 which shows the law:

$$W2N = W3N^{2.75}$$

This law has been established and verified on the basis of experimental data which have shown it to be well founded so long as there are no reflections due to formation (third) interfaces. Using the values of W2NC and W2NG deduced according to FIG. 4, and the curve of FIG. 5, the values of W3NG=0.88, and W3NG=1.16 were obtained.

Figure 5A:
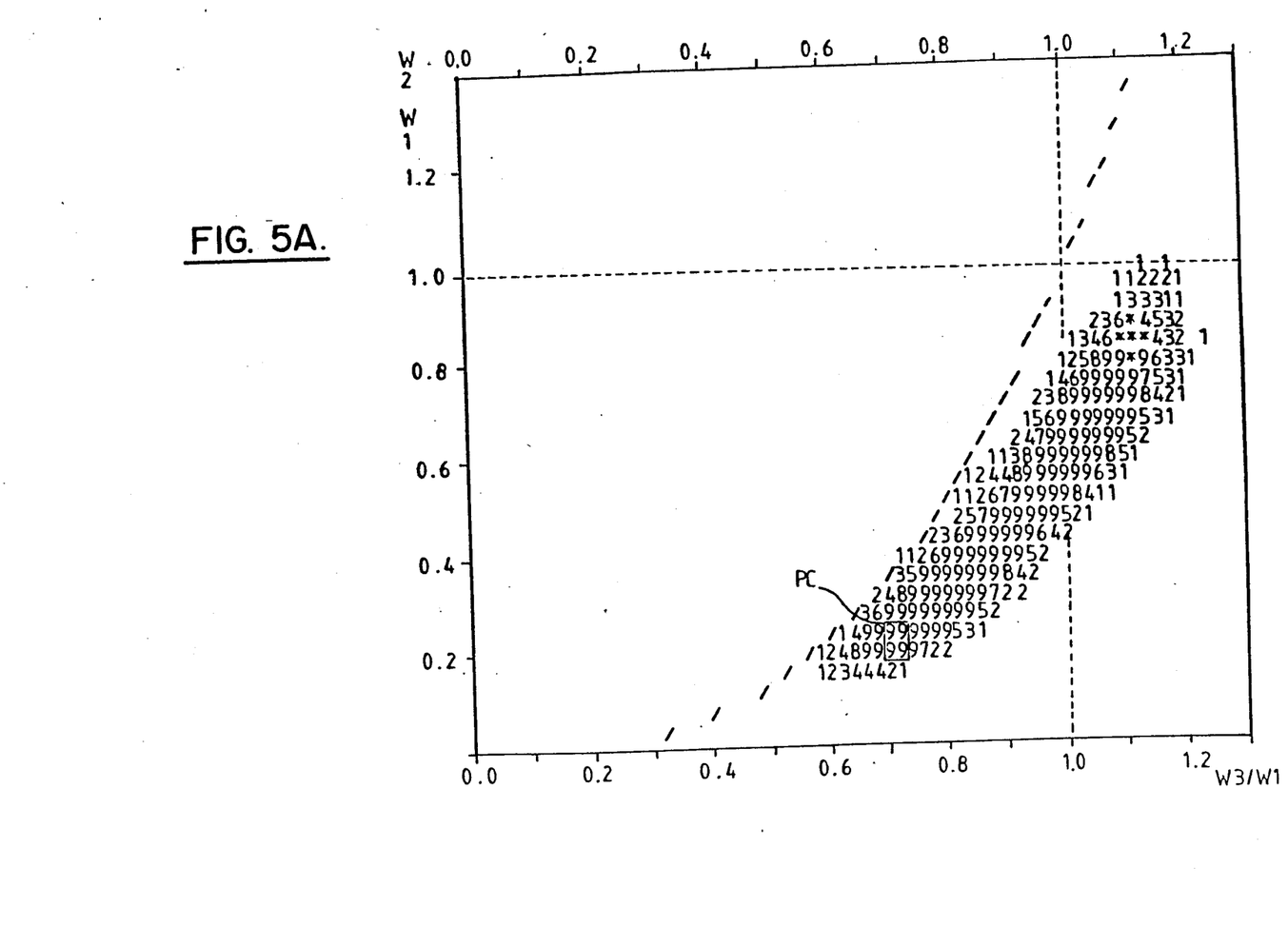
FIGS. 5A and 5B show absolute and normalized measurements respectively obtained from a CET tool.
Figure 5B:
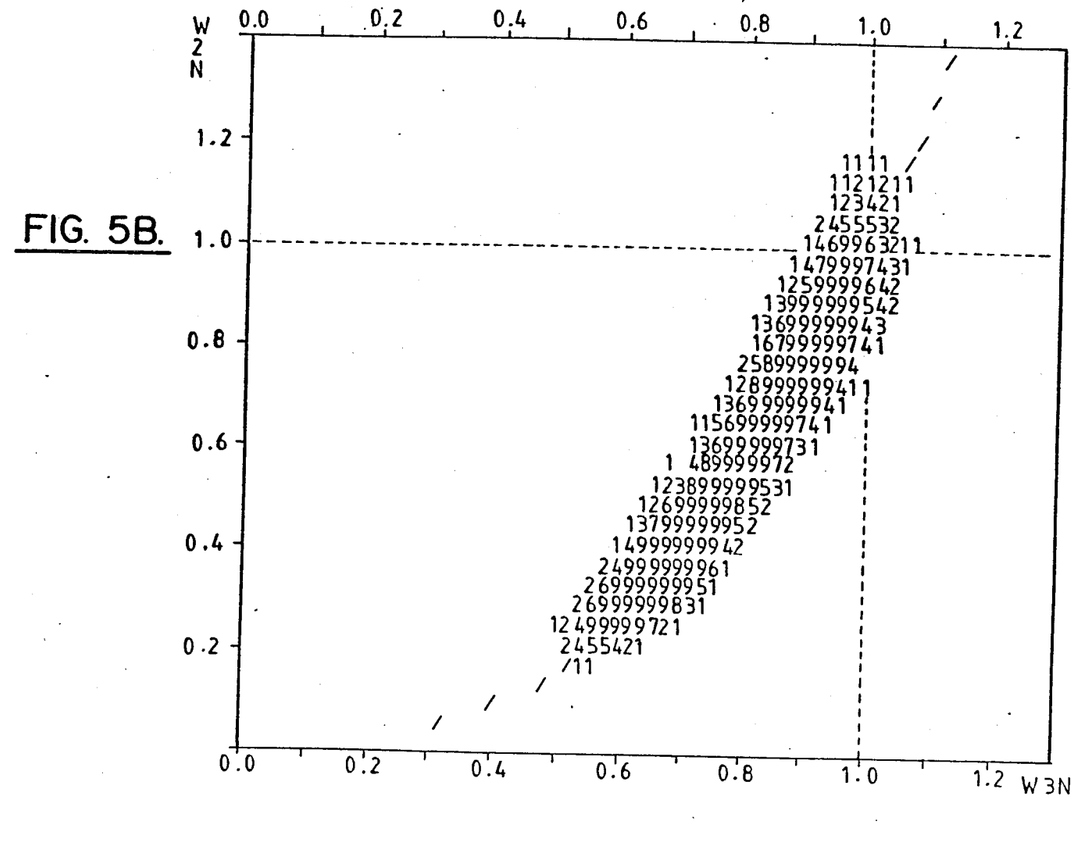

FIGS. 5A and 5B are now used to describe the normalization process in accordance with the invention in a more general manner than the simplified normalization explained above. FIGS. 5A and 5B are frequency plots of a set of measurements obtained by the transducers of the CET tool over a depth of about 500 meters. FIG. 5A shows a "cloud" which illustrates the distribution of the measuring points in statistical frequencies around the interval 0.10. The predetermined law (7) is represented by the sloping bars. The asterisks define the point relating to free casing in waters which the person skilled in the art can in principle identify, e.g. from the centroid (barycenter) of the points in the cloud, given that the presence of gas gives another adjacent cloud with noticeably higher values for W2N and W3N. In practice, the point representative of water is the point from which the frequencies drop off, At the bottom of the cloud, the point with the best cementing, PC, is sought. Given knowledge of the nature of the cement used, its acoustic impedance at depth when properly set can be accurately estimated. Corresponding values W2N and W3N are deduced therefrom. The corresponding values for water are also known. Thus, the four digital data required for determining the four parameters a, a', b, b' are known. Basically, those skilled in the art will realize that b and b' may be calculated from the offset of the best cement point of FIG. 5A from where it should be located according to the predetermined law. After taking the difference between the magnitudes W2N and W3N for water and for cement, the parameters a and a' are determined, with a being the W2 coordinate of the center point of the asterisks in FIG. 5A, and a' being the W3 coordinate thereof.

FIG. 5B shows the normalized data of FIG. 5A centered on the theoretical curve. After normalization, the coordinates of the free casing point are indeed W2N=1=W3N. It will be recognized that a normalization such as of this type is essential for a correct interpretation as to the situation beyond the casing wall.

Figure 6:
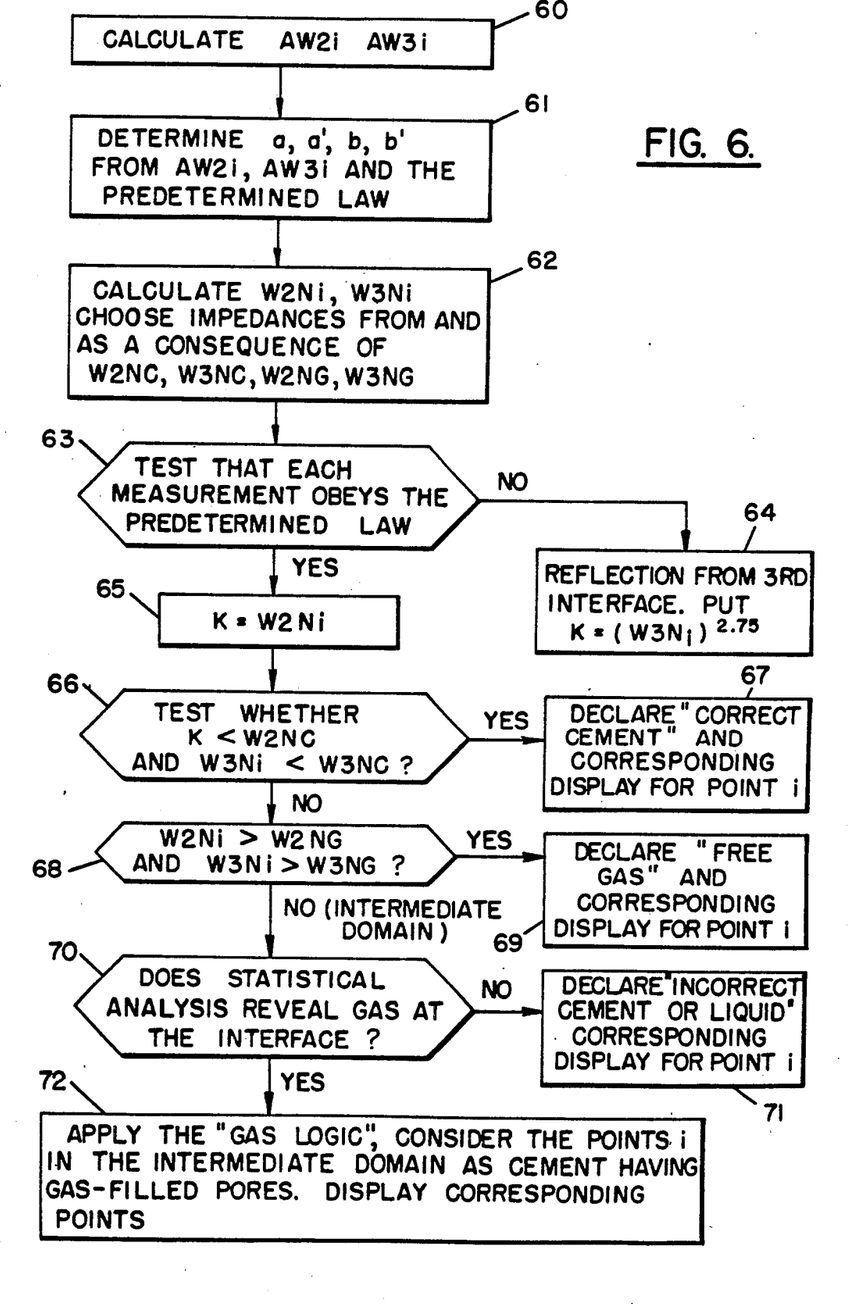
FIG. 6 is a flow chart illustrating various steps in the method according to the invention.

Referring to FIG. 6, the initial step 60 recapitulates the calculation of AW2i and AW3i from the obtained signals. Then, at step 61, the normalization parameters a, a', b and b', are determined as described above. Once the normalization paramteres are set, the normalization of the absolute magnitudes according to relationships (2a) and (2b) may be accomplished at 62. Also at 62, the thresholds W2NC, W3NC, W2NG, and W3NG are set. If information regarding the casing, mud, etc, was known In advance, the thresholds could have been set at an earlier time. At 63, each signal is tested to determine whether the derived normalized magnitudes for that individual signal obeys the predetermined law of equation (7). If the magnitudes do not obey the predetermined law within certain statistical limits, step 64 replaces W2Ni by $$K = (W3Ni)^{2.75}$$

thus eliminating any effect the third interface (formation) might have on the results. If the magnitudes do obey the law, W2Ni is retained at step 65 and taken as the value for K.

After W3Ni and K (W2Ni) are determined, test 66 then examines whether K is less than W2NC and whether W3Ni is less than W3NC. If these two conditions are satisfied, it is declared at step 67 that the cementation is effective and correct and a corresponding display for the point in question is arranged. Those skilled in the art will observe that although test 66 is different from the previously described test, it is equivalent thereto because, if W3Ni is less than W2NC, W2Ni is necessarily less than W2NC due to steps 63 and 64.

If the test 66 gives a negative answer, test 68 examines whether W2Ni (K) is greater than W2NG and whether W3Ni is greater than W3NG. If these two conditions are satisfied, the presence of gas is established and step 69 sets up the corresponding instructions and display. If the output from test 68 does not reveal gas, then it is a question of the intermediate domain, and a statistical test is performed at 70 as described above. This test determines whether, on a given length of casing, a quantity representative of gas at the casing/outside interface has been found. If gas is not evident, poor (incorrect) cement or liquid is declared and displayed. However, if gas is evident, step 72 applies the "gas mode" of the gas logic and a cement with pores filled with gas is declared and a corresponding display instruction is set up.

The display which includes the information declared at 67, 69, 71, and 72 may be, for example, in the form of the cylindrical casing being shown as (mapped into) a two-dimensional rectangle with reference marks for angle and depth. Shading could be used to indicate the various situations found according to the invention. Thus, black shading could indicate points or zones where the cement is correct. No shading (white) could indicate liquid or poor cementation. Pale gray could indicate free gas at the casing/outside interface, while dark grey could indicate cement having pores filled with gas.

On the basis of the display or the information underlying the display, the percentage of the circumference of the casing corresponding to each situation may be calculated for each depth, preferably with the "gassy" cement being added to the correct cement. The three corresponding curves which may vary from 0 to 1 are established using a moving average over a length of about 1 meter (integration). A further statistical analysis of the information underlying these curves makes it possible to determine the quality of the measurements and/or of the normalization.

To effect a determination of the quality of the measurements and/or the normalization, the median W2L of the three lowest values of W2Ni are calculated for each depth, as is the median W2H of the three highest values W2Ni. Likewise, W3L and W3H are determined using the three highest and three lowest values of W3Ni respectively. The four magnitudes W2L, W2H, W3L and W3H are averaged or integrated over about one meter of casing and the curves W2L and W2H integrated in this manner should respectively cover the curves $$(W3L)^{2.75} \text{ and } (W3H)^{2.75}$$

The comparison of the curves serves to monitor the quality of the normalization of the raw or absolute data. Further, the curves W2H and W3H should pass through 1 for free casing which makes it possible to verify whether suitable values have been chosen for the normalization parameters.

After these verifications, which may lead in some cases to the processing being started again (in particular when W2L is too far below (W3L to the 2.75 power), it is possible to move on to acoustic impedance determinations. The acoustic impedance is determined from W2L and the thickness of the casing TH using the relationship $$Z = Zw - (0.30\ TH + 0.20)\ \text{Log}\ W2L \tag{9}$$

where Log designates the natural or Napicrian logarithm. However, if W2L. is greater than W3L to the 2.75 power by more than a tolerance of 0.2, for example, the impedance is determined by W3L to the 2.75 power rather than from W2L which is tainted by early and strong reflections from the formations (third interface).

Using the determined acoustic impedance Z of the cement, the cement compression resistance may then be calculated by one of the following relationships:

$$CS = 1520\, Z - 3800 \tag{10a}$$

$$CS = 1000\, Z - 1500 \tag{10b}$$

where relationship (10a) is used for normal cement, and relationship (10b) is used for foam cement or light cement.

In light of the above, it can be seen that the invention provides considerable advantages at many different levels. It can distinguish between cement having gas-filled pores which may be satisfactory, and incorrect cement or liquid. It can therefore permit on estimate or even an evaluation of the gas permeability of the porous cement (using information of casing specifications, well depth and pressure) as the distance between the gas point of FIG. 5 and the given determination is an indication of the amount of gas contained in the cement. This is very important since a mechanically satisfactory cement may support the casing in a satisfactory manner, but render it in operative if it is permeable (i.e. a "short-circuit" is established between various subsoil layers and/or the surface). The invention further permits a determination of compression resistance with a reasonable certainty that it is actually the cement whose resistance is being determined.

Another important aspect of the invention is that measurements made by the CET tool as described above are comparable and have been compared to measurement made by the CBL tool, and according to the invention an important advantage can be drawn from this comparability.

Turning to FIG. 7, a CBL tool is shown comprising an emitter transducer T, a receiver tronsducer R, and means MC for holding R and T longitudinally spaced in the casing and substantially centered therein. Such a tool is described in detail in U.S. Pat. No. 3,401,773. The CDL tool produces a measurement denoted X relating to the entire circumference of the casing which is integrated over a length of about 1 meter on the basis of vibration induced in the casing. To process this information two constants, FP and BP are defined. FP represents the measurement given by the tool where the casing is free to vibrate (e.g. where gas surrounds the casing), and BP represents the measurement given by the tool where the casing is 100% held (e.g. by cement). The values for FP and BP are determined in a manner known by a person skilled in the art.

The logarithms of magnitudes FP and BP and an up-dated measurement x are then taken. The percentage of the circumference of the casing which is properly held is given by $$\frac{\text{Log } X - \text{Log } FP}{\text{Log } BP - \text{Log } FP} \tag{11}$$

Because this calculation corresponds to the circumference measurements derived from the CFT tool, it should be recognized that the CBL tool may be combined in an advantageous manner in a single tool string with the CET tool so as to simulteneously record corresponding measurements.

It appears that under normal conditions, in particular with no gas at the casing/outside interface, the curve obtained by the CBL tool of the percentage of the circumference of the casing which is properly held corresponds to the curve obtained from a CET tool expressed as a circumference percentage as described above. Indeed, the two should substantially correspond where gas logic has been applied because gassy cement was identified and the CET percentage curve summed the correct cement with the gassy cement. Thus, the presence of gassy cement is verified. If gas logic was not applied, the diverging of the curvos provides an indicator that gassy cement is present. Then it is possible to apply the gas logic. If after the application of the gas logic the resulting curves are still different, a comparison of the two curves provides additional information for the person skilled in the art as is suggested below.

Figure 8:
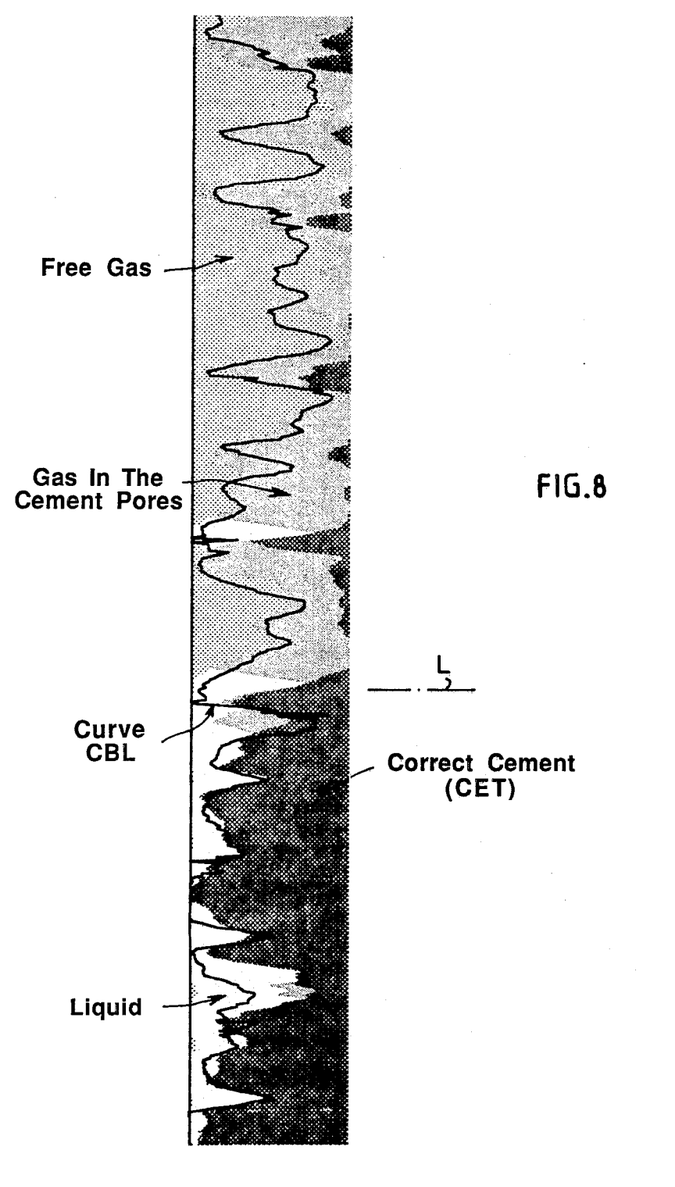
FIG. 8 is one example of a diagram of the kind which the present invention is capable of providing.

FIG. 8 shows a particular example relating to circumferential percentage curves using a moving average over 1 meter (3 feet). In FIG. 8, the while zone illustrates liquid as detected by the CET tool, the dotted gray corresponds to free gas detected by the CET tool, the light gray zone corresponds to gas present in porous cement as detected by the CET, and the dark hatched zone corresponds to correct cement as detected by the CET tool. The solid black line illustrates the result of the CBL measurement as calculated above, and typically the solid black line should correspond to the sum of the dark hatched zone and the light gray zone. The vertical scale corresponds to depth.

The person skilled in the art will recognize that the casing is correctly cemented below line L, and that, on the contrary, it is highly likely that the cement is not performing its role of hydraulic sealing above that line. To completely analyze the situation, the history of the borehole and the circumferential distribution of the CET measurements should be taken into account.

Finally, it is also seen from FIG. 8 that excellent correlation exists between the CET tool curves and the CRL tool curves. Local annalies in this correlation reveal useful phenomens, and experiments have confirmed cases such as an annular micro-space filled with liquid, a thin sheath of cement around the casing, corrosion of the casing or internal deposits, the presence of gas in the annulus, and an annular micro-space filled with gas. Those skilled in the art will be able to distinguish among the various phenomenu by noting the direction the curves take relative to each other and/or by using other information such as obtained from caliper readings and readings taken with excess pressure applied to the inside of the casing.

There has been described and illustrated herein methods of evaluating cement surrounding a casing in a borehole using tools provided with ultrasonic transducers. To that end, a method for making measurement from CBL and CEY tools compatible and enabling these measurements to be interpreted in combination has also been described. While particular embodiments of the invention have been described, it is not intended that the invention be limited thereby, as it is intended that the invention be broad in scope and that the specifications be read likewise. For example, while the specification did not particularly describe the means by which particular magnitudes and parameters were calculated, those skilled in the art will appreciate that various means such as a properly programmed multipurpose computer, dedicated hardware, etc., may be used for the same, and that the invention is preferably accomplished exclusively by machine. Likewise, the calculations and determinations described in the specification may be accomplished on site, at a laboratory, at the sile of the computer being used for calculation, etc., or any combination of thereof. Therefore, it will be apparent to those skilled in the art that other changes and modifications may be made to the invention as described in the specification without departing from the spirit and scope of the invention as claimed.

We claim:

1. A method for evaluating the quality of cement surrounding a borehole casing, comprising:
   (a) obtaining signals which are a function of the axial and angular position of a sonde relative to said casing and which are received in response to ultrasonic pulses suitable for inducing thickness resonance in a casing, said pulses having been emitted by a plurality of emitter/receiver transducers aimed in different angular directions at zones of said casing;
   (b) defining at least two time windows for each of said obtained signals, at least one of said time windows being defined by a first echo corresponding to the reflection of an ultrasonic wave off the inside wall of said casing, and at least another of said time windows corresponding to the initial portion of additional echoes following said first echo, said additional echoes resulting from the environment outside said casing;
   (c) determining at least one normalized magnitude from at least the energy of said signals in said time windows;
   (d) setting at least one act of upper and lower thresholds corresponding to said at least one normalized magnitude; and
   (e) deciding the quality of the environment surrounding said casing as a function of the relationship of said determined normalized magnitude with said set of upper and lower 2. A method according to claim 1, wherein:
   said environment surrounding said casing is determined to be solid cement which is correctly cemented where at least one of said normalized magnitudes is less than the corresponding lower thresholds set for said normalized magnitude.

3. A method according to claim 1, wherein:
   said environment surrounding said casing is determined to be gas where each of said at least one normalized magnitudes exceeds the upper threshold corresponding to said normalized magnitude.

4. A method according to claim 1 wherein:
   said environment surrounding said casing is determined to be one of a group selected from a group consisting of porous cement with gas in the pores, and liquid or poor cement where each of said at least one normalized magnitudes exceeds the lower threshold corresponding to said normalized magnitude and at least one of said normalized magnitudes is below the upper threshold corresponding to said normalized magnitude.

5. A method according to claim 4, further comprising:
   (f) obtaining a second set of signals which were received by a receiver in response to ultrasonic pulses of an ultrasonic emitter axially spaced therefrom;
   (g) processing said second set of signals to make a second determination of the quality of said environment surrounding said casing; and
   (h) comparing the results of the determined quality of said environment surrounding said casing with the results of the second determined quality of said environment surrounding said casing of step (g), wherein
   said environment surrounding said casing is determined to comprise porous cement with gas in the pores where said second determination indicates that the casing is well cemented while the first determination indicates that the environment consists of one of a group selected from a group consisting of porous cement with gas in the pores, and liquid or poor cement; and
   said environment surrounding said casing is determined to comprise liquid or poor cement where said first determination indicates that the environment consists of one of a group selected from a group consisting of porous cement with gas in the pores, and liquid or poor cement, and said second determination agrees with said first determination.

6. A method according to claim 5 wherein:
   the results of the first determined quality of the environment surrounding said cases are subjected to a statistical analysis to supply circumferential percentage data on the percentage of environment consisting of free gas, liquid or poor cement, correct cement, or cement having pores filled with gas, said statistical analysis being based of a moving mean along a length of casing corresponding to the length of casing investigated by said axially spaced ultrasonic receiver and emitter.

7. A method according to claim 1, wherein:
   said environment surrounding said casing is determined to be solid cement which is correctly cemented where at least one of said normalized magnitudes is less than the corresponding lower thresholds set for said normalized magnitude;
   said environment surrounding said casing is determined to be gas where each of said at least one normalized magnitudes exceeds the upper threshold corresponding to said normalized magnitude;
   said environment surrounding said casing is determined to be one of a group selected from a group consisting of porous cement with gas in the pores, and liquid or poor cement where each of said at least one normalized magnitudes exceeds the lower threshold corresponding to said normalized magnitude and at least one of said normalized magnitudes is below the upper threshold corresponding to said normalized magnitude;
   a statistical analysis is performed on said determinations for the zones scanned in different angular directions over a determined length of the casing in order to determine whether gas is present in a predetermined percentage of zones; and
   said environment surrounding said casing is determined to be porous cement with gas in the pores if gas is determined present in at least said predetermined percentage of zones, and said environment surrounding said casing is determined to be liquid or poor cement where gas is determined present in less than said predetermined percentage of zones.

8. A method according to claim 7 wherein:
   said determinations regarding the makeup of said environment surrounding said casing are further analyzed to determine whether the pores of said porous cement permit communication between various underground layers in said borehole.

9. A method according to claim 1, wherein:
said at least two time windows for each obtained signal comprises three time windows, a first time window being defined by a first echo corresponding to the reflection of an ultrasonic wave off the inside wall of said casing, a second time window corresponding to the decreasing intermediate portion of additional echoes following said first echo, said additional echoes resulting from the environment outside said casing, and a third time window corresponding to the initial portion of said additional echoes;
said at least one normalized magnitude for each obtained signal comprises two normalized magnitudes for each obtained signal;
said at least one set of upper and lower thresholds comprises two sets of upper and lower thresholds, one set for each normalized magnitude; and
said quality of the environment surrounding said casing is determined as a function of the relationship of said determined normalized magnitudes with their corresponding sets of upper and lower threshold.

10. A method according to claim 9, wherein:
said normalized magnitudes are determined for each obtained signal by (a) determining two absolute magnitudes for each of said obtained signals, one of said absolute magnitudes representing the ratio of the energy of said signal in the first and second time windows, and the other of said absolute magnitudes representing the ratio of the energy of said signal in the first and third time windows; and (b) normalizing said absolute magnitudes in accordance with linear equations.

11. A method according to claim 10, wherein:
said linear equations are of the form:

$W2Ni = a(AW2i - b)$ $W2Ni = a'(AW3i - b')$ where a, a', b and b' are parameters chosen to take account of the absolute response of a free casing in the presence of a predetermined environment, and where AW2i and AW3i are said absolute magnitude of each signal, and where W2Ni and W3Ni are the normalized magnitudes of each signal.

12. A method according to claim 11, wherein:
said environment surrounding said casing is determined to be solid cement which is correctly cemented where at least one of said normalized magnitudes is less than the correponding lower thresholds set for said normalized magnitude.

13. A method according to claim 11, wherein:
said environment surrounding said casing is determined to be gas where each of said at least one normalized magnitudes exceeds the upper threshold corresponding to said normalized magnitude.

14. A method according to claim 11, wherein:
said environment surrounding said casing is determined to be one of a group selected from a group consisting of porous cement with gas in the pores, and liquid or poor cement where each of said at least one normalized magnitudes exceeds the lower threshold corresponding to said normalized magnitude and at least one of said normalized magnitudes is below the upper threshold corresponding to said normalized magnitude.

15. A method according to claim 11, wherein:
said environment surrounding said casing is determined to be solid cement which is correctly cemented where at least one of said normalized magnitudes is less than the corresponding lower thresholds set for said normalized magnitude;
said environment surrounding said casing is determined to be gas where each of said at least one normalized magnitudes exceeds the upper threshold corresponding to said normalized magnitude;
said environment surrounding said casing is determined to be one of a group selected from a group consisting of porous cement with gas in the pores, and liquid or poor cement where each of said at least one normalized magnitudes exceeds the lower threshold corresponding to said normalized magnitude and at least one of said normalized magnitude is below the upper threshold corresponding to said normalized magnitude;
a statistical analysis is performed on said determinations for the zones scanned in different angular directions over a determined length of the casing in order to determine whether gas is present in a predetermined percentage of zones; and
said environment surrounding said casing is determined to be porous cement with gas in the pores if gas is determined present in at least said predetermined percentage of zones, and said environment surrounding said casing is determined to be liquid or poor cement where gas is determined present in less than said predetermined percentage of zones.

16. A method according to claim 11, wherein:
parameters b and b' are both equal zero.

17. A method according to claim 11, wherein:
parameters b and b' are determined from plotted points representative of the best cement encountered on a chosen length of casing.

18. A method according to claim 11, wherein:
normalization parameters a, a', b, b' are determined so that on a given length of said casing, said normalized magnitudes statistically follow a predetermined law having substantially the form:

$W2Ni = (W3Ni)^{2.75}$

19. A method according to claim 9, wherein:
said lower thresholds are set to distinguish between the impedance characteristics of the minimal acceptable cement, and a heavy mud.

20. A method according to claim 19, wherein:
said upper thresholds are set to distinguish the impedance characteristics of a gas under pressure.

21. A method according to claim 1, further comprising;
(f) the results of the determination of what said environment surrounding said casing includes is displayed, wherein,
said environment surrounding said casing is determined to be solid cement which is correctly cemented where at least one of said normalized magnitudes is less than the corresponding lower thresholds set for said normalized magnitude;
said environment surrounding said casing is determined to be gas where each of said at least one normalized magnitudes exceeds the upper threshold corresponding to said normalized magnitude;
said environment surrounding said casing is determined to be one of a group selected from a group consisting of porous cement with gas in the pores, and liquid or poor cement where each of said at least one normalized magnitudes exceeds the lower threshold corresponding to said normalized magnitude and at least one of said normalized magnitudes is below the upper threshold corresponding to said normalized magnitude;

a statistical analysis is performed on said determinations for the zones scanned in different angular directions over a determined length of the casing in order to determine whether gas is present in a predetermined percentage of zones;

said environment surrounding said casing is determined to be porous cement with gas in the pores if gas is determined present in at least said predetermined percentage of zones, and said environment surrounding said casing is determined to be liquid or poor cement where gas is determined present in less than said predetermined percentage of zones; and said displayed results illustrate the presence of correct cementation, porous cement with gas in the pores, liquid or poor cement, and gas along the depth of said borehole for the zones around the perimeter of said casing.

22. A method according to claim 1, wherein:

said obtained signals are obtained by placing a sonde in said casing, the sonde carrying a tool provided with ultrasonic emitter/receiver transducers aiming at zones in different angular directions, and said transducers being suitable for inducing thickness resonance in the casing;

selectively exciting said transducers to emit pulses; and selectively recording the signals received in response to each emitted pulse, said signals containing data on the environment surrounding the casing in the zone scanned by the transducer, taking account of the axial and angular position of the sonde in the casing.

23. A method for evaluating the quality of cement surrounding a borehole casing, comprising:

(a) obtaining signals by placing a sonde in said casing, the sonde carrying a tool provided with ultrasonic emitter/receiver transducers aiming at zones in different angular directions, and said tranducers being suitable for inducing thickness resonance in the casing;

(b) selectively exciting said transducers to emit pulses;

(c) selectively recording the signals received in response to each emitted pulse, said signals containing data on the environment surrounding the casing in the zone scanned by the transducer, taking account of the axial and angular position of the sonde in the casing;

(d) defining at least two time windows for each of said obtained signals, at least one of said time windows being defined by a first echo corresponding to the reflection of an ultrasonic wave off the inside well of said casing, and at least another of said time windows corresponding to the initial portion of additional echoes following said first echo, said additional echoes resulting from the environment outside said casing;

(e) determining at least one normalized magnitude from at least the energy of said signals in said time windows;

(f) setting at least one set of upper and lower thresholds corresponding to said at least one normalized magnitude; and (g) deciding the quality of the environment surrounding said casing as a function of the relationship of said determined normalized magnitude with said set of upper and lower thresholds.

24. A method according to claim 23, wherein:

said at least two time windows for each obtained signal comprises three time windows, a first time window being defined by a first echo corresponding to the reflection of an ultrasonic wave off the inside wall of said casing, a second time window corresponding to the decreasing intermediate portion of additional echoes following said first echo, said additional echoes resulting from the environment outside said casing, and a third time window corresponding to the initial portion of said additional echoes;

said at least one normalized magnitude for each obtained signal comprises two normalized magnitudes for each obtained signal;

said at least one set of upper and lower thresholds comprises two sets of upper and lower thresholds, one set for each normalized magnitude; and said quality of the environment surrounding said casing is determined as a function of the relationship of said determined normalized magnitudes with their corresponding sets of upper and lower thresholds.

25. A method according to claim 24, wherein:

said normalized magnitudes are determined for each obtained signal by (a) determining two absolute magnitudes for each of said obtained signals, one of said absolute magnitudes representing the ratio of the energy of said signal in the second and first time windows, and the other of said absolute magnitudes representing the ratio of the energy of said signal in the third and first time windows; and (b) normalizing said absolute magnitudes in accordance with linear equations of the form:

$$W2N_i = a(AW2_i - b)$$

$$W3N_i = a'(AW3_i - b')$$

where $a$, $a'$, $b$ and $b'$ are parameters chosen to take account of the absolute response of a free casing in the presence of a predetermined environment, and where $AW2_i$ and $AW3_i$ are said absolute magnitudes of each signal, and where $W2N_i$ and $W3N_i$ are the normalized magnitudes of each signal.

26. A method according to claim 25, wherein:

said environment surrounding said casing is determined to be solid cement which is correctly cemented where at least one of said normalized magnitudes is less than the corresponding lower thresholds set for said normalized magnitude.

27. A method according to claim 25 wherein:

said environment surrounding said casing is determined to be gas where each of said normalized magnitudes exceeds the upper threshold corresponding to said normalized magnitude.

28. A method according to claim 25 wherein:

said environment surrounding said casing is determined to be one of a group selected from a group consisting of porous cement with gas in the pores, and liquid or poor cement where each of said normalized magnitudes exceeds the lower thresholds corresponding to said normalized magnitude and at least one of said normalized magnitudes is below the upper threshold corresponding to said normalized magnitude.

29. A method according to claim 25, wherein:

said environment surrounding said casing is determined to be solid cement which is correctly cemented where at least one of said normalized magnitudes is less than the corresponding lower thresholds set for said normalized magnitude;

said environment surrounding said casing is determined to be gas where each of said normalized magnitudes exceeds the upper threshold corresponding to said normalized magnitudes;

said environment surrounding said casing is determined to be one of a group selected from a group consisting of porous cement with gas in the pores, and liquid or poor cement where each of said normalized magnitudes exceeds the lower threshold corresponding to said normalized magnitude and at least one of said normalized magnitudes is below the upper threshold corresponding to said normalized magnitude;

a statistical analysis is performed on said determinations for the zones scanned in different angular directions over a determined length of the casing in order to determine whether gas is present in a predetermined percentage of zones; and said environment surrounding said casing is determined to be porous cement with gas in the pores if gas is determined present in at least said predetermined percentage of zones, and said environment surrounding said casing is determined to be liquid or poor cement where gas is determined present in less than said predetermined percentage of zones.

30. A method according to claim 29, further comprising:

(h) the results of the determination of what said environment surrounding said casing includes is displayed, wherein said displayed results illustrate the presence of correct cementation, porous cement with gas in the pores, liquid or poor cement, and gas along the depth of said borehole for the zones around the perimeter of said casing.

31. A method according to claim 29, wherein:

said determinations regarding the makeup of said environment surrounding said casing are further analyzed to determine whether the pores of said porous cement permit communication between various underground layers in said borehole.

32. A method according to claim 25, further comprising:

(h) obtaining a second set of signals which were received by a receiver in response to ultrasonic pulses of an ultrasonic emitter axially spaced therefrom;

(i) processing said second set of signals to make a second determination of the quality of said environment surrounding said casing; and (j) comparing the results of the determined quality of said environment surrounding said casing with the results of the second determined quality of said environment surrounding said casing of step (i), wherein said environment surrounding said casing is determined to comprise porous cement with gas in the pores where said second determination indicates that the casing is well cemented while the first determination indicates that the environment consists of one of a group selected from a group consisting of porous cement with gas in the pores, and liquid or poor cement; and said environment surrounding said casing is determined to comprise liquid or poor cement where said first determination indicates that the environment consists of one of a group selected from a group consisting of porous cement with gas in the porous, and liquid or poor cement, and said second determination agrees with said first determination.

* * * * *